(12) United States Patent
Anno

(10) Patent No.: US 9,039,149 B2
(45) Date of Patent: May 26, 2015

(54) LIQUID FEEDING DEVICE AND METHOD OF DETERMINING TIME OF EXCHANGE OF GAS CONTROL ELEMENT

(71) Applicant: Dainippon Screen MFG. CO., LTD., Kyoto (JP)

(72) Inventor: Motoyuki Anno, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 13/760,899

(22) Filed: Feb. 6, 2013

(65) Prior Publication Data

US 2013/0242006 A1    Sep. 19, 2013

Related U.S. Application Data

(63) Continuation of application No. PCT/JP2011/052869, filed on Feb. 10, 2011.

(30) Foreign Application Priority Data

Aug. 31, 2010    (JP) ................................. 2010-193244

(51) Int. Cl.
*B41J 2/175*    (2006.01)
*B01D 19/00*    (2006.01)
*B41J 2/19*    (2006.01)
(Continued)

(52) U.S. Cl.
CPC ........ *B01D 19/0063* (2013.01); *B01D 19/0031* (2013.01); *B01D 19/0036* (2013.01); *B41J 2/19* (2013.01); *B41J 2/195* (2013.01); *B01D 63/02* (2013.01); *B01D 2313/90* (2013.01)

(58) Field of Classification Search
USPC ............................................................ 347/85
See application file for complete search history.

(56) References Cited

U.S. PATENT DOCUMENTS 4,730,634 A    3/1988    Russell
5,674,397 A *  10/1997   Pawlak et al. ................. 210/436
(Continued)

FOREIGN PATENT DOCUMENTS

EP    1905597 A2    4/2008
EP    2030793 A1    3/2009
(Continued)

OTHER PUBLICATIONS

Int'l Preliminary Report on Patentability for PCT Appl. No. PCT/JP2011/052869, dated Mar. 21, 2013.
International Search Report for application PCT/JP2011/052869 mailed Mar. 8, 2011.
(Continued)

*Primary Examiner* — Stephen Meier
*Assistant Examiner* — Alexander D Shenderov
(74) *Attorney, Agent, or Firm* — Dorsey & Whitney LLP

(57) ABSTRACT

Ink in an ink tank is fed through a dissolved gas control filter to a printer head. A gas pressure changing mechanism reduces pressure in a gas pressure control tank. In response, the dissolved gas control filter removes gas dissolved in the ink. The gas pressure control tank is placed under pressure corresponding to a sum of the pressure reduced by the gas pressure changing mechanism and the pressure of the gas having been removed from the liquid. A gas pressure measuring part measures the sum of these pressures as pressure in the gas pressure control tank. Then, a controller determines when time of exchange of the dissolved gas control filter has come based on the magnitude of a gradient of gas pressure variation in the gas pressure control tank.

6 Claims, 5 Drawing Sheets

(51) Int. Cl.
*B41J 2/195* (2006.01)
*B01D 63/02* (2006.01)

(56) References Cited

U.S. PATENT DOCUMENTS

| | | | |
|---|---|---|---|
| 6,402,818 B1 * | 6/2002 | Sengupta | 96/6 |
| 6,843,121 B1 | 1/2005 | DeBar et al. | |
| 7,909,443 B2 * | 3/2011 | Hirato | 347/85 |
| 2002/0168773 A1 | 11/2002 | Ito et al. | |
| 2003/0234030 A1 | 12/2003 | Shibayama | |
| 2008/0049084 A1 | 2/2008 | Katada | |
| 2008/0079792 A1 | 4/2008 | Hirato | |
| 2009/0058899 A1 | 3/2009 | Umeda | |
| 2009/0167829 A1 | 7/2009 | Iijima | |

FOREIGN PATENT DOCUMENTS

| | | |
|---|---|---|
| GB | 1464554 A | 2/1977 |
| JP | 10-000305 | 1/1998 |
| JP | 2004-301978 | 10/2004 |
| JP | 2005-053075 | 3/2005 |
| JP | 2005-199682 | 7/2005 |
| JP | 2007-229977 | 9/2007 |
| JP | 2008-194966 | 8/2008 |
| WO | 2007-063720 | 6/2007 |
| WO | 2008035120 A1 | 3/2008 |

OTHER PUBLICATIONS

Extended European Search Report for related EP case (appl. No. 11821353.7) mailed Mar. 18, 2014.

* cited by examiner

F I G. 2
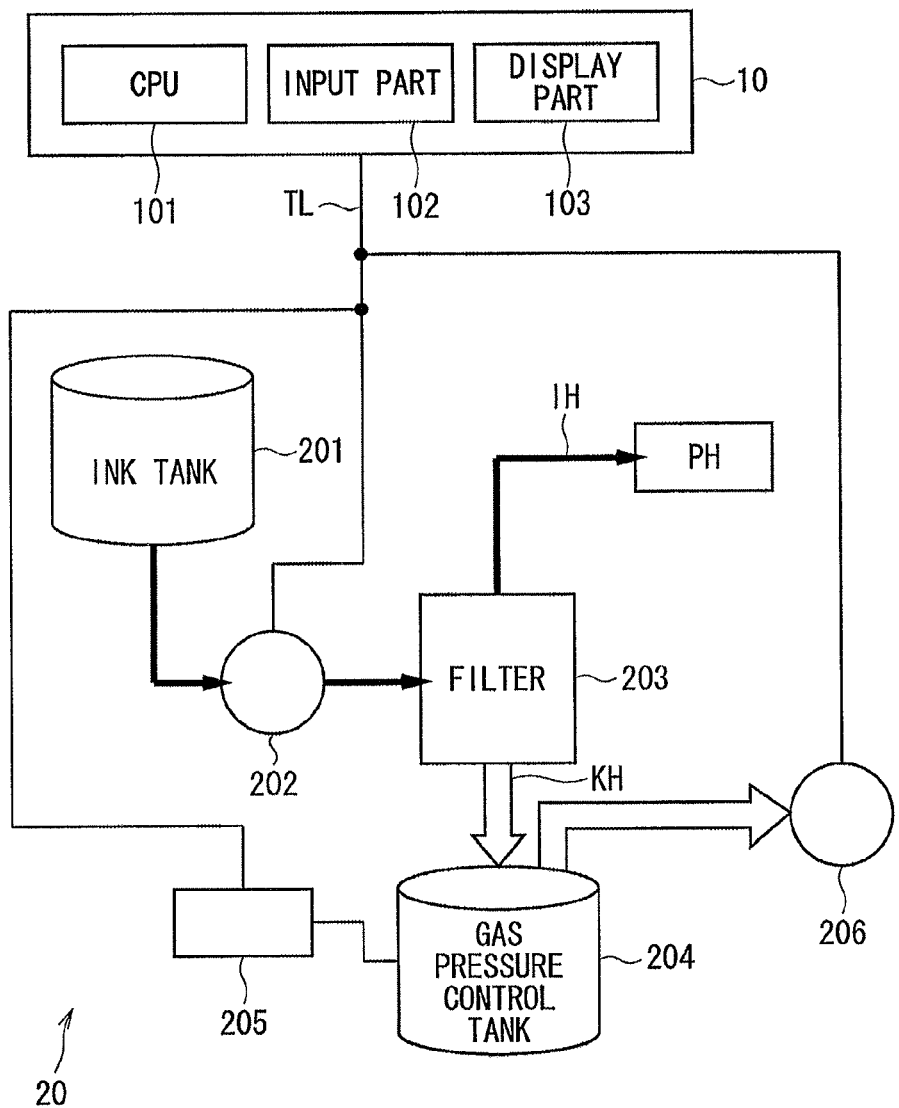

F I G. 3
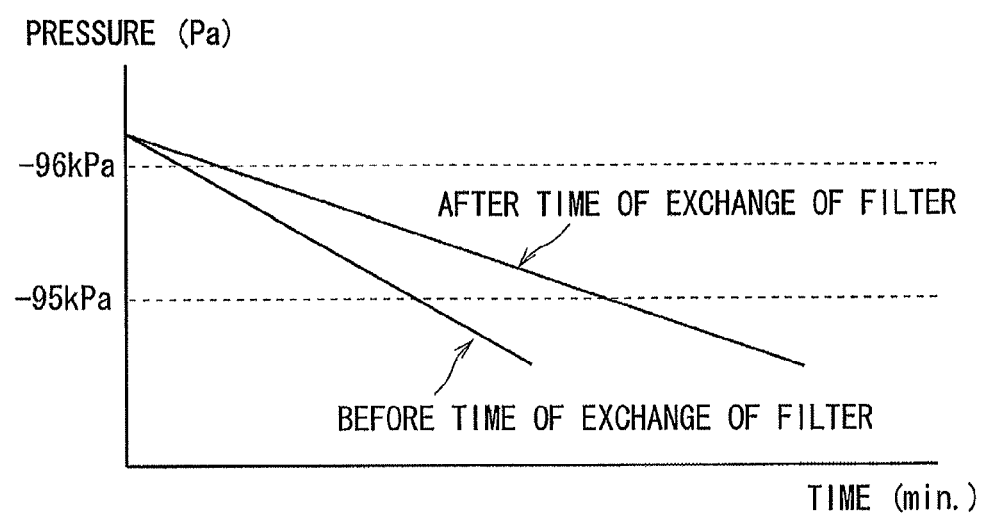

LIQUID FEEDING DEVICE AND METHOD OF DETERMINING TIME OF EXCHANGE OF GAS CONTROL ELEMENT

CROSS-REFERENCE TO RELATED APPLICATIONS

This application is a continuation of International Application No. PCT/JP2011/052869, filed Feb. 10, 2011, which claims priority to JP Application No. 2010-193244, filed Aug. 31, 2010. These applications are incorporated by reference herein in their entirety and for all purposes.

TECHNICAL FIELD

The present invention relates to a liquid feeding device including dissolved gas processing means that processes dissolved gas in liquid to be fed through a feeding system to a desirable mechanism, and a method of determining time of exchange of a gas control element provided in a feeding system that controls the amount of gas dissolved in liquid.

BACKGROUND ART

Degassing technique of removing dissolved gas from liquid has been employed in various fields. As an example, removal of oxygen dissolved in water ($H_2O$) is a generally employed way to prevent rust on a boiler and a pipe, and create water for precision cleaning. Of, if water is used as a solvent for a dye or a colorant used as ink in an ink-jet printer, and if gas in the form of a large number of tiny bubbles is dissolved in the water, a capillary tube of an ink-jet head is clogged. This leads to discharge failure. So, degassing technique of liquid has also become an important issue.

Meanwhile, technique of dissolving gas in liquid has also been in use. As an example, liquid prepared by dissolving carbon dioxide in ultrapure de-ionized water may be employed as a cleaning liquid used in a semiconductor manufacturing device. In this case, a desired liquid can be obtained by supplying carbon dioxide existing in the atmosphere to the ultrapure de-ionized water.

According to process conventionally employed for degassing of liquid or gas supply to the liquid, the liquid is heated or boiled, or is exposed in vacuum or in a low pressure condition. According to technique that becomes well known in recent years, a filter for dissolved gas control is added in a liquid feeding system, and pressure on the filter is controlled, thereby removing gas dissolved in liquid or adding the gas to the liquid.

In many cases, a membrane using a hollow fiber membrane is employed as the aforementioned dissolved gas control filter. The hollow fiber membrane employed as the membrane filter is formed by integrating fibers having hollows literally at the centers thereof, and having a diameter of from about 180 to about 240 μm and a thickness of from about 25 to about 50 μm. For degassing with the hollow fiber membrane, while liquid penetrates into the insides of the hollow fibers, the pressure of gas contacting the outer skins of the hollow fibers is reduced. In response, molecules of gas dissolved in the liquid move toward a direction under reduced pressure through gaps between the outer skins of the hollow fibers. Degassing is also realized in a converse way in the following structure: while the outer skins of the hollow fibers contact liquid, pressure inside the hollow fibers is reduced, so that the molecules of gas dissolved in the liquid move toward the insides of the hollow fibers.

Gas supply is realized in the way as follows opposite to that of degassing: by increasing the pressure of gas contacting the outer skins of the hollow fibers, molecules of the gas are caused to move into liquid having penetrated into the insides of the hollow fibers. Gas supply is also realized in a converse way as follows: by increasing pressure inside the hollow fibers, molecules of gas are caused to move into liquid contacting the outer skins of the hollow fibers.

A material of a structure having a large number of tiny holes of a size that allows passage of gas molecules but does not allow passage of liquid molecules is applicable as a material for the dissolved gas control filter. The dissolved gas control filter may be realized not only by a hollow fiber membrane but also by a stacked porous membrane, ceramic, or sintered metal powder.

Not only the dissolved gas control filter but also a generally employed filter suffers from clogging by the use of the filter, so that the filtering function thereof cannot be assured unless it is exchanged within a certain period of time.

If the dissolved gas control filter is an unused condition, it is capable of reducing the concentration of dissolved gas in liquid for example to 6.5 mg/L within a predetermined period of time. However, if the concentration of the dissolved gas after reduction within the predetermined period of time becomes 10.8 mg/L or more due to generation of clogging, it is determined that the dissolved gas control filter lost its filtering function. In this case, the dissolved gas control filter should be exchanged.

There are techniques, such as those disclosed in patent literatures 1 and 2, employed to check time of exchange of the aforementioned filter.

CITATION LIST

Patent Literature

Patent Literature 1: Japanese Patent Application Laid-Open No. 2002-48776
Patent Literature 2: Japanese Patent Application Laid-Open No. 2004-301978

SUMMARY OF THE INVENTION

Problems to be Solved by the Invention

Time of exchange of the dissolved gas control filter may be determined in the exemplary way as follows: the concentration of dissolved oxygen in liquid after being subjected to degassing is measured for a predetermined period of time, and then it is determined based on change of the concentration with time if time of exchange of the dissolved gas control filter has come.

However, a dissolved oxygen meter for measuring the concentration of dissolved oxygen conducts precise measurement, so that it should be calibrated at regular intervals.

Additionally, due to the expensiveness of the dissolved oxygen meter, it is difficult to mount the dissolved oxygen meter on an ink-jet printer that is a relatively small-sized device.

A filtering function may be assured by exchanging the dissolved gas control filter at regular intervals. In this case, however, exchange of a filter is unavoidable even if time of exchange of this filter has not come, leading to a problem in that maintaining a filtering function entails relatively high costs.

So, it is an object of the present invention to provide a liquid feeding device capable of determining at relatively low costs if time of exchange of a gas control element has come, and a method of determining time of exchange of a gas control element provided in a feeding system that controls the amount of gas dissolved in liquid.

Means for Solving Problems

In order to solve the aforementioned problems, a liquid feeding device of a first aspect is a liquid feeding device that feeds liquid through a feeding system to a predetermined mechanism, and includes dissolved gas processing part that processes dissolved gas in the liquid. The dissolved gas processing part includes: a gas control element provided in the feeding system, the gas control element controlling the amount of gas dissolved in the liquid by using gas pressure acting on the gas control element; a pressure controller that controls the gas pressure acting on the gas control element; gas pressure changing part that changes gas pressure in the pressure controller; gas pressure measuring part that measures gas pressure variation in the pressure controller, the gas pressure variation being caused based on the gas pressure change by the gas pressure changing part and the control of the amount of gas dissolved in the liquid by the gas control element; and gas control element exchange suggesting part that suggests exchange of the gas control element when a result of measurement of the gas pressure variation by the gas pressure measuring part becomes the same as or lower than a predetermined threshold.

According to a liquid feeding device of a second aspect, in the liquid feeding device of the first aspect, the gas control element includes a hollow fiber membrane.

According to a liquid feeding device of a third aspect, the liquid feeding device of the first aspect further includes maintenance sequence executing part that performs maintenance of a device including the dissolved gas processing part at given time. The gas pressure measuring part measures the gas pressure variation in the pressure controller while the maintenance sequence executing part performs operation for maintenance. The gas control element exchange suggesting part suggests exchange of the gas control element when a result of measurement of the gas pressure variation by the gas pressure measuring part becomes the same as or lower than the predetermined threshold.

According to a liquid feeding device of a fourth aspect, in the liquid feeding device of the first aspect, the gas pressure change in the pressure controller by the gas pressure changing part is pressure reduction.

According to a liquid feeding device of a fifth aspect, in the liquid feeding device of the first aspect, the predetermined mechanism to receive liquid is a printer head of an ink-jet printer.

A method of determining time of exchange of a gas control element of a sixth aspect is a method of determining time of exchange of a gas control element provided in a feeding system that controls the amount of gas dissolved in liquid. The gas control element controls the amount of gas dissolved in the liquid by using gas pressure acting on the gas control element. The method includes a measuring step of measuring gas pressure variation for a predetermined period of time in a pressure controller that controls the gas pressure acting on the gas control element, the gas pressure variation being caused based on change of gas pressure applied in the gas controller and the control of the amount of gas dissolved in the liquid by the gas control element, and a determining step of determining that time of exchange of the gas control element has come and suggesting exchange thereof when a result of measurement of the gas pressure variation obtained in the measuring step becomes the same as or lower than a predetermined threshold.

Advantageous Effects of the Invention

The liquid feeding device of the first aspect measures the gas pressure variation in the pressure controller for a predetermined period of time based on the gas pressure change by the gas pressure changing part and the control of the amount of gas dissolved in liquid by the gas control element. When time of exchange of the gas control element has not come, gas in large amounts is caused to move by pressure. Thus, gas pressure exhibits steep variation, so that the amount of the steep variation can be acquired from a result of measurement of the gas pressure. In contrast, when time of exchange of the gas control element has come, the gas control element suffers from clogging. So, gas in small amounts is caused to move by pressure. In this case, a result of measurement shows that gas pressure varies gently, so that the amount of the gentle variation can be acquired from the result. Thus, when a result of measurement of gas pressure variation shows that the amount of the variation becomes the same as or lower than a predetermined threshold, it is determined that time of exchange of the gas control element has come and exchange thereof is suggested. As a result, it is possible to know time of exchange of the gas control element by referring only to a result of measurement by the normally provided gas pressure measuring part and without the need of providing a costly dissolved gas measuring unit.

Even if a hollow fiber membrane is used to control gas dissolved in liquid, the liquid feeding device of the second aspect is still capable of achieving the same effect as that achieved by the first aspect.

The liquid feeding device of the third aspect makes determination about time of exchange of the gas control element as part of the operation for maintenance of the liquid feeding device. So, exchange of the gas control element does not require additional working process.

The liquid feeding device of the fourth aspect realizes degassing of gas dissolved in liquid by pressure reduction, so that it is capable of achieving the same effect as that achieved by the first aspect.

Even if being applied to an ink-jet printer that is a relatively small-sized device, the liquid feeding device of the fifth aspect is still capable of achieving the same effect as that achieved by the first aspect.

The method of determining time of exchange of a gas control element of the sixth aspect measures the gas pressure variation in the pressure controller for a predetermined period of time based on the change of gas pressure applied in the gas controller and the control of the amount of gas dissolved in liquid by the gas control element. When time of exchange of the gas control element has not come, gas in large amounts is caused to move by pressure. Thus, gas pressure exhibits steep variation, so that the amount of the steep variation can be acquired from a result of measurement of the gas pressure. In contrast, when time of exchange of the gas control element has come, the gas control element suffers from clogging. So, gas in small amounts is caused to move by pressure. In this case, a result of measurement shows that gas pressure varies gently, so that the amount of the gentle variation can be acquired from the result. Thus, when a result of measurement of gas pressure variation shows that the amount of the variation becomes the same as or lower than a predetermined threshold, it is determined that time of exchange of the gas control element has come and exchange thereof is suggested.

As a result, it is possible to know time of exchange of the gas control element by referring only to a result of measurement by the normally provided gas pressure measuring part and without the need of providing a costly dissolved gas measuring unit.

BRIEF DESCRIPTION OF DRAWINGS

FIG. 2 is a view explaining principal parts of a controller and a printer relating to the present invention.

FIG. 3 is a view explaining the principle of the present invention.

EMBODIMENT(S) FOR CARRYING OUT THE INVENTION

Figure 1:
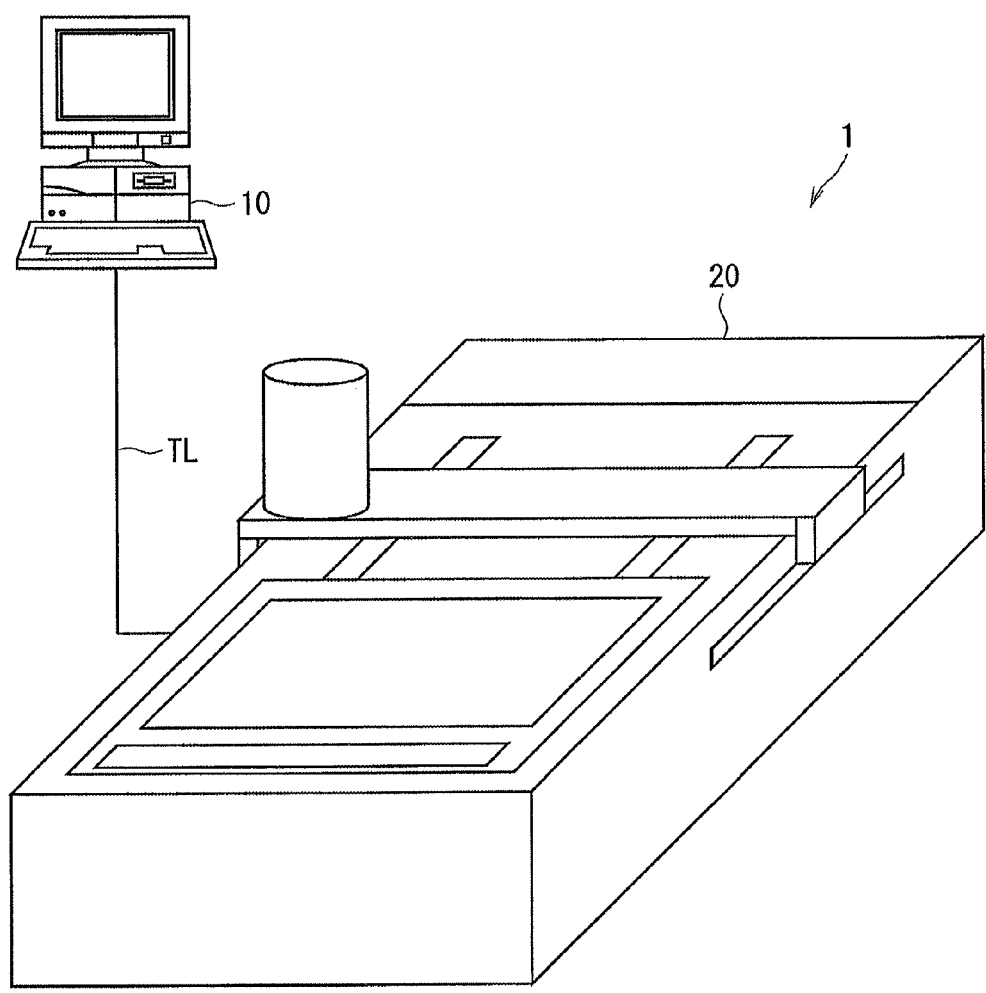
FIG. 1 is a view explaining an ink-jet printing device relating to the present invention.

Embodiments of the present invention are described below by referring to the drawings.

First Embodiment

FIG. 1 is a view explaining an ink-jet printing device 1 relating to the present invention. The ink-jet printing device 1 includes a controller 10 that controls the entire ink-jet printing device 1, and a printer 20 that makes a print on a base material. The controller 10 and the printer 20 are electrically connected through a communication line TL. The printer 20 operates in response to control information given from the controller 10, so that the ink-jet printing device 1 is capable of making a desirable printed matter.

Here, the controller 10 and the printer 20 are described as separate units. However, the controller 10 and the printer 20 may be integral with each other to form the ink-jet printing device 1.

FIG. 2 is a view explaining principal parts of the controller 10 and the printer 20 relating to the present invention. The controller 10 includes an arithmetic processing part 101, an input part 102, and a display part 103.

The arithmetic processing part 101 performs predetermined arithmetic processing to control the entire ink-jet printing device 1. In particular, the arithmetic processing part 101 performs process described later to determine time of exchange of a dissolved gas control filter 203.

The input part 102 has the function of entering information to control the ink-jet printing device 1, and is realized by a mouse and a keyboard, for example. The input part 102 is used particularly for entering pressure control used in controlling the amount of gas dissolved in ink by process described later. The input part 102 is also used for making an entry for executing a maintenance sequence in the ink-jet printing device 1.

The display part 103 has the function of presenting the condition of the ink-jet printing device 1, for example, and is realized by a liquid crystal display, a plasma display, or the like. In particular, the display part 103 presents an indication to the effect that time of exchange of a dissolved gas control filter has come as a result of process described later.

The input part 102 and the display part 103 may be provided as an integrated structure such as a touch panel. Alternatively, the input part 102 or the display part 103 may be provided outside the controller 10.

The printer 20 includes an ink tank 201, an ink feeding mechanism 202, the dissolved gas control filter 203, a gas pressure control tank 204, a gas pressure measuring part 205, and a gas pressure changing mechanism 206.

The ink tank 201 stores ink to be fed to a printer head PH connected to the ink tank 201 through an ink line IH. An open tank system and a cartridge system are both applicable as a system for the ink tank 201.

The ink feeding mechanism 202 has an ink feed pump and a feed valve. Based on a control signal given from the controller 10 electrically connected to the ink feeding mechanism 202 through the communication line TL, the ink feeding mechanism 202 drives the ink feed pump, and opens the feed valve, thereby feeding the ink stored in the ink tank 201 to the ink line IH.

The dissolved gas control filter 203 is a filter to control the amount of gas dissolved in the ink. The dissolved gas control filter 203 is connected to the ink line IH. The ink penetrates into the inside of the dissolved gas control filter 203. Further, a gas line KH covers the dissolved gas control filter 203 from outside. The dissolved gas control filter 203 performs degassing of the ink or gas supply to the ink as a result of gas pressure control realized by process through the gas line KH described later.

The ink line IH may cover the dissolved gas control filter 203 from outside, and the inside of the dissolved gas control filter 203 may be connected to the gas line KH.

The dissolved gas control filter 203 is a membrane filter using a hollow fiber membrane. The dissolved gas control filter 203 may also be composed of a stacked porous membrane, ceramic, or sintered metal powder. Any filter is applicable as the dissolved gas control filter 203 as long as it has a structure that allows passage of gas molecules but does not allow passage of liquid molecules.

The gas pressure control tank 204 is a tank functioning as a buffer to control gas pressure to act on the dissolved gas control filter 203 through the gas line KH. The gas pressure control tank 204 is provided with the gas pressure measuring part 205.

The gas pressure measuring part 205 is a pressure meter to measure pressure in the gas pressure control tank 204. The gas pressure measuring part 205 transits measured pressure to the controller 10 electrically connected to the gas pressure measuring part 205 through the communication line TL. A generally used pressure meter is applicable as that of the gas pressure measuring part 205.

The gas pressure changing mechanism 206 has a gas control pump and a gas valve. Based on a control signal given from the controller 10 electrically connected to the gas pressure changing mechanism 206 through the communication line TL, the gas pressure changing mechanism 206 drives the gas control pump, and opens the gas valve, thereby controlling pressure in the gas pressure control tank 204.

Pressure control by the gas pressure changing mechanism 206 means pressure reduction realized by sucking gas in the gas pressure control tank 204 with the gas control pump, or pressure increase realized by supplying gas under pressure into the gas pressure control tank 204 with the gas control pump. In the case of the ink-jet printing device 1, the gas pressure changing mechanism 206 normally performs pressure reduction in order to prevent clogging of a capillary tube in the printer head PH.

FIG. 3 is a view explaining the principle of the present invention. The gas pressure changing mechanism 206 reduces pressure in the gas pressure control tank 204, so that negative pressure acts on the dissolved gas control filter 203. In response, the dissolved gas control filter 203 removes gas dissolved in liquid (in the first embodiment, ink), and the removed gas moves to the gas pressure control tank 204 through the gas line KH. So, the gas pressure control tank 204 is placed under pressure corresponding to a sum of the pressure reduced by the gas pressure changing mechanism 206 and the pressure of the gas having been removed from the liquid with the dissolved gas control filter 203. The gas pressure measuring part 205 measures the sum of these pressures as pressure in the gas pressure control tank 204.

If time of exchange of the dissolved gas control filter 203 has not come, the filter is free from clogging and the like. So, dissolved gas is removed smoothly from liquid by pressure reduction. Thus, pressure in the gas pressure control tank 204 is reduced for example from −96 kPa to −95 kPa in a short period of time as shown in FIG. 3. In this case, a gradient $\Delta P$ of gas pressure variation is "large." In the present specification, the magnitudes of the gradients of gas pressure variation are determined based on a comparison between the absolute values thereof.

Meanwhile, if time of exchange of the dissolved gas control filter 203 has come, a resistance to gas suction develops due to clogging and the like generated in the filter, so that dissolved gas is not removed smoothly from liquid by pressure reduction. As a result, pressure in the gas pressure control tank 204 is reduced for example from −96 kPa to −95 kPa in a long period of time. In this case, the gradient $\Delta P$ of gas pressure variation is "small."

Thus, it can be determined if time of exchange of the dissolved gas control filter 203 has come based on the magnitude of the gradient $\Delta P$ of gas pressure variation in the gas pressure control tank 204. The gradient $\Delta P$ of gas pressure variation is calculated by the controller 10 based on pressure variation in the gas pressure control tank 204 measured for a predetermined period of time by the gas pressure measuring part 205.

Figure 4:
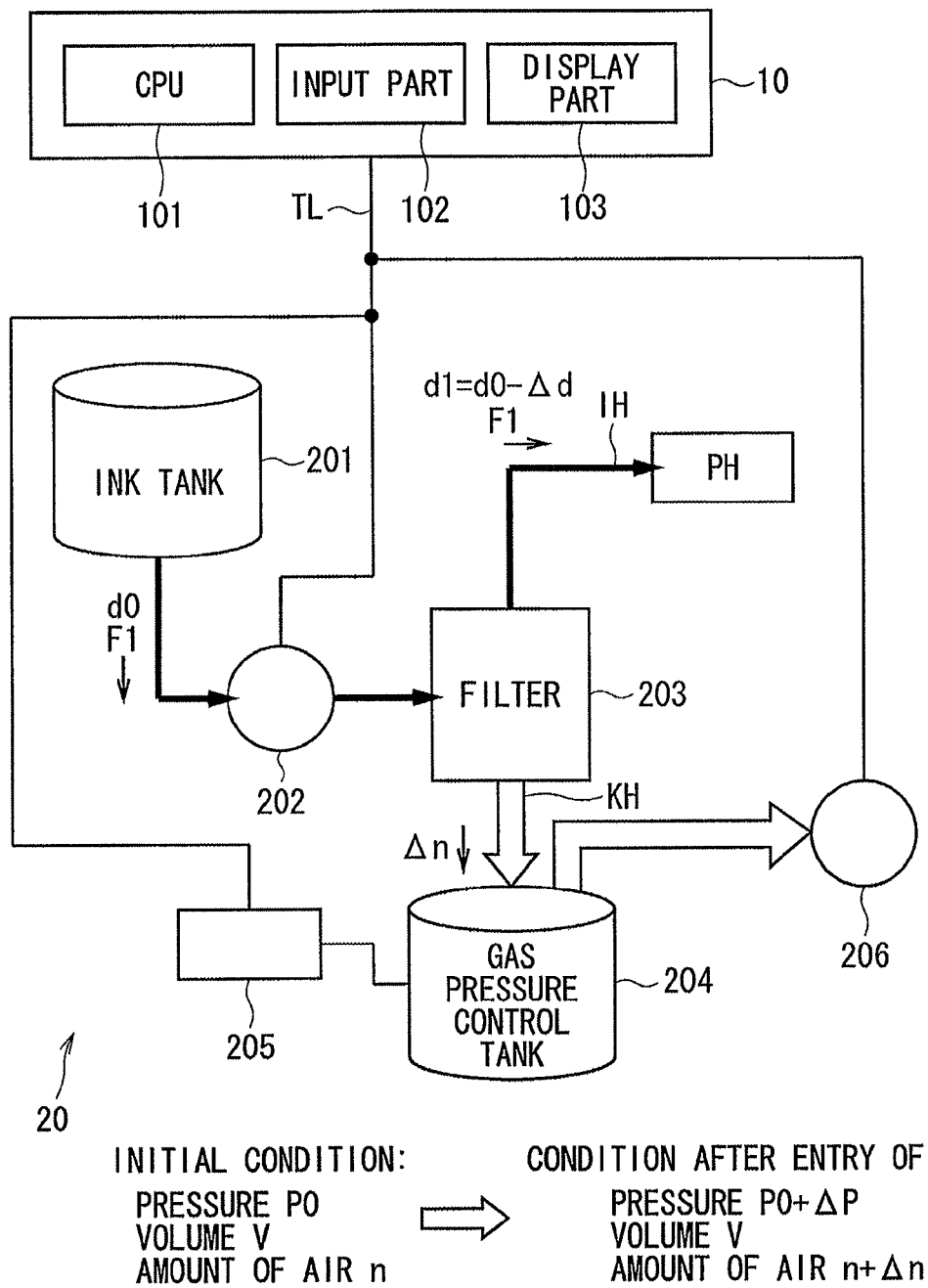
FIG. 4 is an explanatory view including the ink-jet printing device shown in FIG. 2, and additionally, flows of ink and gas in the principal part.

Pressure variation in the gas pressure control tank 204 as a result of removal of oxygen dissolved in liquid is described by referring to FIG. 4. FIG. 4 is an explanatory view including the ink-jet printing device 1 shown in FIG. 2, and additionally, flows of ink and gas in the principal part.

First, the concentration of oxygen initially contained in ink to be used in the ink-jet printing device 1, specifically, the concentration of oxygen dissolved in the ink to be fed from the ink tank 201 is expressed as $d0$ (mg/L). Further, the flow rate of the ink caused to flow through the ink line IH by the ink feeding mechanism 202 is expressed as $F1$ (L/min), and the amount of variation of dissolved oxygen degassed with the dissolved gas control filter 203 is expressed as $\Delta d$ (mg/L). Then, the concentration of oxygen dissolved in the ink after the degassing, expressed as $d1$ (mg/L), is obtained from the following formula:

$$d1 = d0 - \Delta d \quad (1)$$

The flow rate of the ink is expressed as $F1$ as described above. So, the amount of oxygen $\Delta O$ (mg/min) per unit time removed from the ink with the dissolved gas control filter 203 as a result of pressure reduction is obtained as the amount of variation expressed as follows:

$$\Delta O = \Delta d \times F1 \quad (2)$$

The weight ratio of oxygen in the air is 23.01%, and the average molecular weight of the air is 28.966 (g/mol). So, the amount of variation of the air $\Delta n$ (mol/min) removed from the ink is expressed by the following formula:

$$\Delta n = (\Delta O \times 0.001 \times (100/23.01))/28.966 = 0.1500 \times 10^{-3} \times \Delta O \quad (3)$$

Meanwhile, if inner pressure, a volume, the amount of substance in the air, and the thermodynamic temperature of the air are expressed as P0, V, n, and T respectively, an initial condition of the gas pressure control tank 204 is obtained by the following formula according to the ideal gas law. In the formula (4), R is a gas constant.

$$P0 \cdot V = n \cdot R \cdot T \quad (4)$$

If the gas pressure changing mechanism 206 reduces pressure in the gas pressure control tank 204, gas having been removed with the dissolved gas control filter 203 from the ink flowing through the ink line IH flows into the gas pressure control tank 204 through the gas line KH. This changes a gaseous state in the gas pressure control tank 204, and the following formula (5) is obtained from the formula (4):

$$(P0 + \Delta P) \times V = (n + \Delta n) \times R \times T \quad (5)$$

In the formula (5), $\Delta P$ is the amount of variation of the inner pressure as a result of flow of the gas having been removed with the dissolved gas control filter 203 into the gas pressure control tank 204, and is synonymous with the aforementioned gradient of gas pressure variation in the gas pressure control tank 204. Further, $\Delta n$ represents the amount of variation of the air removed from the ink. Temperature variation accompanying the pressure variation is considerably small, so that it is not considered. Based on the formulas (4) and (5), the gradient $\Delta P$ of gas pressure variation in the gas pressure control tank 204, determined after flow of the gas having been removed with the dissolved gas control filter 203 into the gas pressure control tank 204, is expressed by the following formula:

$$\Delta P = (\Delta n \cdot R \cdot T)/V \quad (6)$$

The formulas (1), (2), (3) and (6) are summarized to obtain the gradient $\Delta P$ of gas pressure variation (Pa/min) as follows:

$$\Delta P = (0.1500 \times 10^{-3} \times \Delta d \times F1 \times R \times T)/V \quad (7)$$

The thermodynamic temperature T of gas is not an important factor, so that it is treated as a constant value as follows: T=300 (K), for example. Or, if the ink-jet printing device 1 has a structure of measuring an ambient environment temperature, the thermodynamic temperature T of gas may be treated as an actually measured value.

The controller 10 calculates the gradient $\Delta P$ of gas pressure variation in compliance with predetermining timing. As an example, when the dissolved gas control filter 203 is exchanged, the controller 10 always calculates the amount of variation $\Delta P$ of gas pressure. Thus, the amount of variation $\Delta P$ of gas pressure determined immediately after the exchange can be acquired. If an operator of the ink jet printing device 1 enters instructions with the input part 102 to calculate the gradient $\Delta P$ of gas pressure variation in compliance with desired timing, the controller 10 calculates the gradient $\Delta P$ of gas pressure variation at the time, and compares the calculated gradient $\Delta P$ to a threshold of a gradient that is deemed bring about exchange of the dissolved gas control filter 203. If it is determined as a result of the comparison that the gradient $\Delta P$ of gas pressure variation is the same as or lower than the predetermined threshold, the controller 10 presents an indication on the display part 103 to the effect that the dissolved gas control filter 203 should be exchanged.

The controller 10 may also compare the gradient $\Delta P$ of gas pressure variation calculated in response to instructions by the operator and the amount of variation $\Delta P$ of gas pressure calculated immediately after exchange of the dissolved gas control filter 203. In this case, if a difference in the amount of variation $\Delta P$ of gas pressure (to be specific, reduction in the amount of variation ΔP) becomes greater than a predetermined value, the controller 10 presents an indication on the display part 103 to the effect that the dissolved gas control filter 203 should be exchanged.

Or, the controller 10 may function as a maintenance sequencer to perform maintenance of the entire ink-jet printing device 1 at regular intervals, and the controller 10 may calculate the gradient ΔP of gas pressure variation each time the controller 10 performs the maintenance. In this case, if the gradient ΔP of gas pressure variation calculated during operation for the maintenance becomes the same as or lower than the aforementioned predetermined threshold, the controller 10 may present an indication on the display part 103 to the effect that the dissolved gas control filter 203 should be exchanged. Or, the controller 10 may compare the gradient ΔP of gas pressure variation determined at the time of previous maintenance and the gradient ΔP of gas pressure variation determined at the time of current maintenance. In this case, if it is determined as a result of the comparison that a difference in the amount of variation ΔP of gas pressure becomes greater than the predetermined value, the controller 10 may present an indication on the display part 103 to the effect that the dissolved gas control filter 203 should be exchanged.

As described above, by calculating the gradient ΔP of gas pressure variation, time of exchange of the dissolved gas control filter 203 can be determined easily, and exchange of the dissolved gas control filter 203 can be suggested.

Second Embodiment

In the description given so far, the gradient ΔP of gas pressure variation is generally calculated based on the weight ratio of oxygen in the atmosphere. However, water vapor cannot be disregarded as a practical matter in removal of dissolved gas with the dissolved gas control filter 203.

So, the amount of variation of the air removed from ink and containing water vapor in large quantities may be calculated by transforming the formula (3) as follows:

$$\Delta n = (\Delta 0 \times 0.001 \times (100+a)/23.01)/(28.966+b) \quad (3')$$

Here, a is the weight ratio of water vapor in the air. Further, b is the molecular weight of water vapor that is generally 18 (g/mol). The weight ratio a of water vapor may be treated as a constant based on the normal humidity of from 45 to 85% determined by the JIS (Japanese Industrial Standard). The weight ratio of water vapor may also be acquired by adding a structure of acquiring the ambient humidity of the ink jet printing device 1.

In consideration of carbon dioxide and the like having a high degree of solubility in liquid, the formula (3) may also be transformed as follows:

$$\Delta n = (\Delta 0 \times 0.001 \times (A/23.01))/B \quad (3'')$$

Here, A is a weight ratio between gas containing carbon dioxide and the like in large quantities and oxygen determined when the gas is removed from liquid, and B is the average molecular weight of the gas in this case.

Time of exchange of the dissolved gas control filter 203 can still be determined easily, and exchange of the dissolved gas control filter 203 can still be suggested by the aforementioned way of calculating the gradient ΔP of gas pressure variation.

Supposing that targeted gas is not oxygen dissolved in liquid but is a different dissolved gas, the formula (3) is rewritten as follows:

$$\Delta n = (\Delta w \times 0.001)/C \quad (3''')$$

Here, Δw is the amount of the targeted gas (mg/L) having been removed from ink, and C is the average molecular weigh of the targeted gas.

Third Embodiment

The description given so far relates to determination about time of exchange of the dissolved gas control filter 203 responsible for degassing of liquid. Meanwhile, the technique of the present invention is also applicable to determination about time of exchange of a dissolved gas control filter that supplies gas to liquid.

A cleaning liquid used in a semiconductor manufacturing device is an example of the case of gas supply to liquid. Such a cleaning liquid is prepared by supplying carbon dioxide to ultrapure de-ionized water. Carbon dioxide is also supplied to liquid in many cases for preparation of an artificial carbonated spring, for example.

A dissolved gas control filter responsible for such gas supply suffers from clogging due to dust existing in gas to be supplied. So, long-time use of the dissolved gas control filter reduces the gas supply efficiency thereof. Thus, time of exchange should also be determined about the dissolved gas control filter used in gas supply to liquid.

Figure 5:
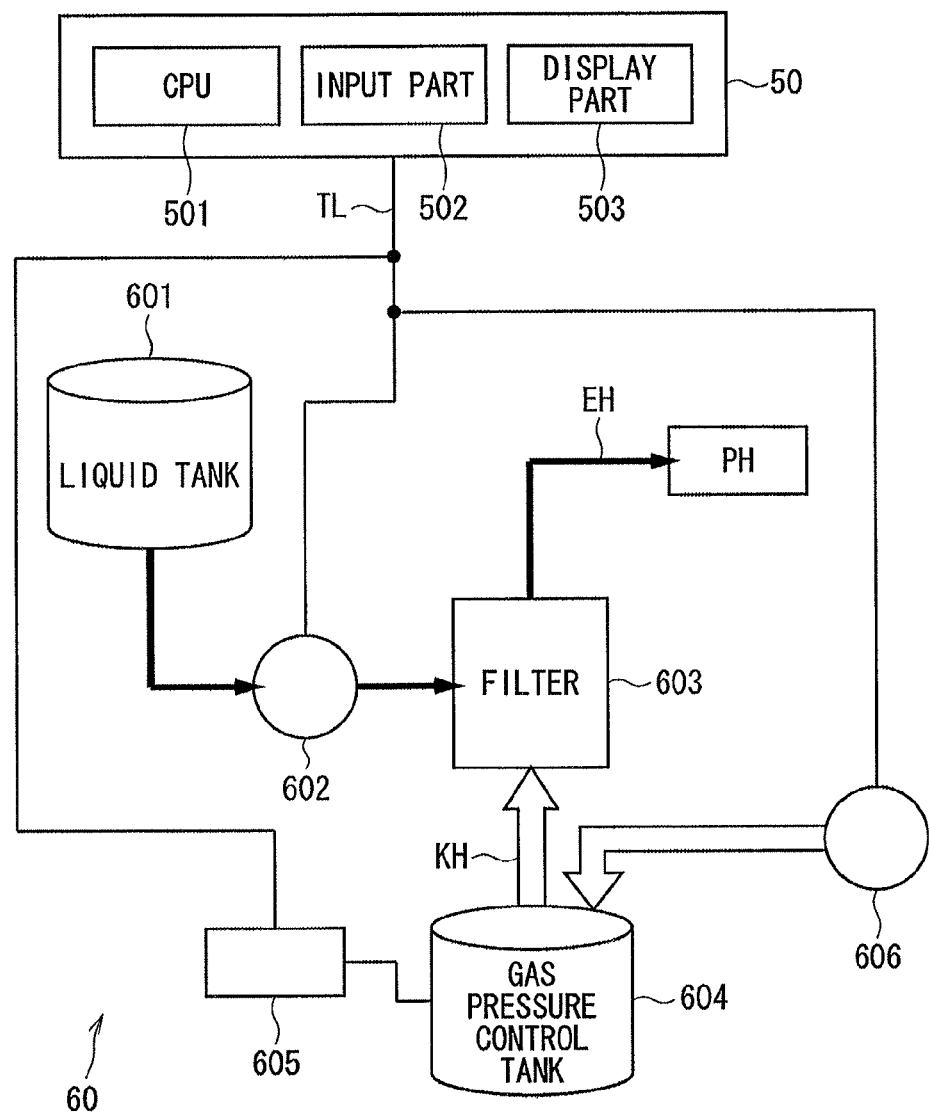
FIG. 5 is a view explaining principal parts of a controller and a liquid feeding device that supply gas to liquid.

FIG. 5 is a view explaining principal parts of a controller 50 and a liquid feeding device 60 that supply gas to liquid. An arithmetic processing part 501 of the controller 50 performs process described later to determine time of exchange of a dissolved gas control filter 603. The functions of an input part 502 and a display part 503 of the controller 50 are substantially the same as those of the input part 102 and the display part 103 of FIG. 2, so that they will not be described again.

The liquid feeding device 60 includes a liquid tank 601, a liquid feeding mechanism 602, the dissolved gas control filter 603, a gas pressure control tank 604, a gas pressure measuring part 605, and a gas pressure changing mechanism 606. These structures except the gas pressure changing mechanism 606 are substantially the same as the ink tank 201, the ink feeding mechanism 202, the dissolved gas control filter 203, the gas pressure control tank 204, and gas pressure measuring part 205 of the printer 20 shown in FIG. 2, so that they will not be described again.

The gas pressure changing mechanism 606 has a tank for gas to be supplied, a gas control pump, and a gas valve. Based on a control signal given from the controller 50 electrically connected to the gas pressure changing mechanism 606 through a communication line TL, the gas pressure changing mechanism 606 drives the gas control pump, opens the gas valve, and supplies the gas stored in the tank for gas to be supplied into the gas pressure control tank 604, thereby controlling pressure in the gas pressure control tank 604.

In response to the increase of pressure in the gas pressure control tank 604 by the gas pressure changing mechanism 606, the dissolved gas control filter 603 dissolves the gas in liquid. Then, the gas pressure control tank 604 is placed under pressure corresponding to a difference between the pressure increased by the gas pressure changing mechanism 606 and the pressure of the gas dissolved in the liquid with the dissolved gas control filter 603. The gas pressure measuring part 605 measures this difference as pressure in the gas pressure control tank 604.

If time of exchange of the dissolved gas control filter 603 has not come, the filter is free from clogging and the like. So, gas is dissolved smoothly in liquid by pressure increase. Thus, a gradient ΔP of gas pressure variation is still "large." Like in the first embodiment, the magnitudes of the gradients of gas pressure variation are determined based on a comparison between the absolute values thereof.

Meanwhile, if time of exchange of the dissolved gas control filter 603 has come, a resistance to gas supply develops due to clogging and the like generated in the filter, so that gas is not dissolved smoothly in liquid by pressure increase. As a result, the gradient ΔP of gas pressure variation in the gas pressure control tank 604 becomes "small."

Thus, it can be determined if time of exchange of the dissolved gas control filter 603 has come based on the magnitude of the gradient ΔP of gas pressure variation in the gas pressure control tank 604. Like in the first embodiment, the gradient ΔP of gas pressure variation is calculated by the controller 50 based on pressure variation in the gas pressure control tank 604 measured for a predetermined period of time by the gas pressure measuring part 605.

Pressure variation in the gas pressure control tank 604 generated as a result of dissolve of gas in liquid is described below.

First, the concentration of oxygen initially contained in liquid to be used in the liquid feeding device 60 is expressed as d0 (mg/L). Further, the flow rate of the liquid caused to flow through a liquid line EH by the liquid feeding mechanism 602 is expressed as F1 (L/min), and the amount of variation of gaseous oxygen supplied with the dissolved gas control filter 603 is expressed as Δd (mg/L). Then, the concentration of oxygen dissolved in the liquid after the gas supply, expressed as d1 (mg/L), is obtained from the following formula:

$$d1 = d0 + \Delta d \quad (10)$$

Then, the formulas (10), (2), (3) and (6) are summarized to obtain the gradient ΔP of gas pressure variation (Pa/min) as follows:

$$\Delta P = (0.1500 \times 10^{-3} \times \Delta d \times F1 \times R \times T)/V \quad (70)$$

The formula (70) is the same as the formula (7). This clearly shows that, in the cases of both pressure reduction and pressure increase, the gradient ΔP of gas pressure variation is usable in determining time of exchange of a dissolved gas control filter.

As described above, by calculating the gradient ΔP of gas pressure variation, time of exchange of the dissolved gas control filter 603 can be determined easily, and exchange of the dissolved gas control filter 603 can be suggested.

<Modifications>

The description given so far relates to determination about time of exchange of the dissolved gas control filter 203 that performs degassing of ink in the ink-jet printing device 1. However, ink is not the only liquid of the present invention to become a solvent for gas.

As an example, the present invention is also applicable if a dissolved gas control filter is responsible for degassing of water used in a boiler and the like.

Further, liquid is not limited to an aqueous liquid but it may also be an organic solvent.

Additionally, instead of measuring gas pressure variation in the gas pressure control tank 204, pressure in the gas line KH may be increased or reduced directly by the gas pressure changing mechanism 206, and resultant gas pressure variation in the gas line KH may be measured and used for determination.

REFERENCE SIGNS LIST

1 Ink-jet printing device
10, 50 Controller
20 Printer
60 Liquid feeding device
101, 501 Arithmetic processing part
102, 502 Input part
103, 503 Display part
201 Ink tank
202 Ink feeding mechanism
203, 603 Dissolved gas control filter
204, 604 Gas pressure control tank
205, 605 Gas pressure measuring part
206, 606 Gas pressure changing mechanism
601 Liquid tank
602 Liquid feeding mechanism
EH Liquid line
IH Ink line
KH Gas line
TL Communication line

The invention claimed is:

1. A liquid feeding device that feeds liquid through a feeding system to a predetermined mechanism, the liquid feeding device comprising dissolved gas processing part that processes dissolved gas in said liquid, said dissolved gas processing part including:

a gas control element provided in said feeding system, the gas control element controlling the amount of gas dissolved in said liquid by using gas pressure acting on the gas control element;

a pressure control tank functioning as a buffer for controlling the gas pressure acting on said gas control element;

gas pressure changing part that changes gas pressure in said pressure control tank;

gas pressure measuring part that measures gas pressure variation in said pressure control tank while said gas control element controls the amount of gas dissolved in said liquid fed through said feeding system, the gas pressure variation being caused based on the gas pressure change by said gas pressure changing part and the control of the amount of gas dissolved in said liquid by said gas control element; and gas control element exchange suggesting part that suggests a time of exchange of said gas control element has come when a gradient of the gas pressure variation in said pressure control tank obtained from a result of measurement of the gas pressure variation by said gas pressure measuring part becomes the same as or lower than a predetermined threshold.

2. The liquid feeding device according to claim 1, wherein said gas control element includes a hollow fiber membrane.

3. The liquid feeding device according to claim 1, further comprising maintenance sequence executing part that performs maintenance of a device including said dissolved gas processing part at given time, wherein said gas pressure measuring part measures the gas pressure variation in said pressure control tank while said maintenance sequence executing part performs operation for maintenance, and said gas control element exchange suggesting part suggests exchange of said gas control element when a result of measurement of the gas pressure variation by said gas pressure measuring part becomes the same as or lower than the predetermined threshold.

4. The liquid feeding device according to claim 1, wherein the gas pressure change in said pressure control tank by said gas pressure changing part is pressure reduction.

5. The liquid feeding device according to claim 4, wherein the pressure in said pressure control tank measured by said gas pressure measuring part is the sum of the pressure of the gas having been removed from said liquid by said gas control element and the pressure of the gas reduced by said gas pressure changing part.

6. The liquid feeding device according to claim 1, wherein said predetermined mechanism to receive liquid is a printer head of an ink-jet printer and said liquid is ink.

* * * * *